United States Patent [19]
Claassen et al.

[11] Patent Number: 4,741,751
[45] Date of Patent: May 3, 1988

[54] EXTENDED SURFACE PRESSING MOLD AND METHOD OF SHEET SHAPING

[75] Inventors: George R. Claassen, New Kensington; Rudolph A. Karlo, Creighton; Richard V. Posney, Freeport, all of Pa.

[73] Assignee: PPG Industries, Inc., Pittsburgh, Pa.

[21] Appl. No.: 615

[22] Filed: Jan. 5, 1987

[51] Int. Cl.$^4$ ............................................. C03B 23/03
[52] U.S. Cl. ......................................... 65/106; 65/104; 65/273; 65/290; 65/291
[58] Field of Search .................. 65/104, 106, 107, 114, 65/273, 290, 291

[56] References Cited

U.S. PATENT DOCUMENTS

| | | | |
|---|---|---|---|
| 3,682,613 | 8/1972 | Johnson et al. | 65/291 |
| 4,229,200 | 10/1980 | Seymour. | |
| 4,305,746 | 12/1981 | Hagedorn et al. | 65/106 |
| 4,496,386 | 1/1985 | Hymore et al. | 65/106 |
| 4,501,603 | 2/1985 | Frank et al. | 65/106 |
| 4,508,556 | 4/1985 | Bennett et al. | 65/107 X |
| 4,579,577 | 4/1986 | Claassen | 65/273 |

FOREIGN PATENT DOCUMENTS 1149864 10/1961 Fed. Rep. of Germany ........ 65/290

Primary Examiner—Arthur Kellogg
Attorney, Agent, or Firm—Andrew C. Siminerio

[57] ABSTRACT

An extended surface pressing mold for a horizontal press bending arrangement. The lower mold provides a glass sheet engaging surface having a first portion which complements and generally parallels a first portion of an upper sheet engaging surface of an aligned upper mold, a wing portion which extends from the first portion of lower mold and is nonparallel to a corresponding second aligned portion of the sheet engaging surface of the upper mold, and a ring portion positioned outwardly from the wing portion and generally complementing a third aligned portion of the upper sheet engaging surface of the upper mold near a portion of the perimeter of the glass sheet. The ring portion moves from the first position wherein the ring portion is in a non-engaging position relative to the heat softened glass sheet to a second position wherein the ring portion contacts and engages a perimeter portion of the heat softened glass sheet to press the perimeter portion against the third portion of the upper mold.

11 Claims, 3 Drawing Sheets

FIG. I

EXTENDED SURFACE PRESSING MOLD AND METHOD OF SHEET SHAPING

BACKGROUND OF THE INVENTION

1. Field of the Invention

This invention relates to the bending of heat softened sheet material and in particular to horizontal press bending of heat softened glass sheets using a novel mold arrangement.

2a. Technical Considerations

Shaped and tempered glass sheets are widely used as side windows or rear windows in vehicles such as automobiles and the like. To be suitable for such applications, flat glass sheets must be shaped to precisely defined curvatures dictated by the shape and outline of the window opening frames of the vehicles into which the windows are installed. It is also important that the windows meet stringent optical requirements and that the windows be free of optical defects that would tend to interfere with a clear viewing area.

The commercial production of shaped glass sheets for such purposes commonly includes heating flat glass sheets to their softening temperature, shaping the heated glass sheets to a desired curvature, and cooling the bent glass sheets in a controlled manner to a temperature below the annealing range of the glass. During such treatment, a glass sheet is conveyed along a substantially horizontal path that extends through a tunnel-type furnace. The glass sheet is one of a series of sheets and is heated to its heat softening temperature and transferred into a shaping station adjacent to the furnace, for example, by a vacuum pick-up and shuttle arrangement. When in the shaping station, the glass sheet is pressed between a pair of vertically aligned upper and lower shaping molds. The upper mold is generally a vacuum mold that holds the heat softened glass sheet thereagainst by suction after shaping and the shaping surface of the lower mold generally complements the shaping surface of the upper mold. After shaping, a transfer and tempering ring having an outline shape conforming in elevational contour to that desired for the shaped glass sheet slightly inboard of its perimeter moves upstream into a position below the upper vacuum mold. Release of the vacuum deposits the glass sheet onto the tempering ring which supports the peripheral portion of the glass while it conveys the glass sheet into a cooling station for rapid cooling. The rapid cooling tempers the glass and increases its resistance to breakage.

As vehicle stylists strive towards more aerodynamic designs, the shapes of the glass sheets are becoming more complex. These designs include small radius bends, deep sags, and severe wraps along the longitudinal end portions of the glass. In order to press glass sheets with these configurations, the lower mold often times includes pivoting end sections to press the glass. Prior to pressing, the end sections are in a downward orientation so as to allow the heat softened glass sheet to be positioned as close as possible to the shaping surface of the lower mold. If these end portions of the lower mold were in an upward position prior to pressing, the glass sheet would have to be deposited onto the lower mold from an elevation at least equal to the depth of the wrap of the final glass configuration. Such an arrangement may cause misalignment or marking of the glass sheet due to the distance the glass sheet must be dropped onto the lower mold. After depositing the glass sheet on the lower mold, the end portions pivot upwardly as the glass sheet is pressed between the upper and lower molds.

It has been found that in using pivoting molds of this design, the pressed glass sheet may include optical defects along the line between the stationary center section of the lower pressing mold and the pivoting end portions. It would be advantageous to have a lower mold design that would reduce any optical defects resulting from the pressing operation while at the same time providing a pressing arrangement capable of fabricating the deep wrap and other complex glass designs.

2b. Patents of Interest

U.S. Pat. No. 4,229,200 to Seymour teaches a method of shaping glass sheets by drop forming. Auxiliary shaping means are employed in conjunction with a flat vacuum plenum in order to impart localized curvature to side portions of the glass sheet while the overall curvature is provided by the force of dropping the glass sheet onto a peripheral shaping mold. The flat plenum is adapted to engage less than the full area of the upper major surface of the glass sheet, leaving at least one side portion of the glass sheet extending beyond the edge of the plenum. The auxiliary shaping means act upon the extending portion of the glass sheet as the glass is held on the plenum, so as to preshape that portion of the glass sheet prior to dropping the sheet onto the shaping mold. Lifting means may be used for urging the extending portion of the glass sheet into engagement with the auxiliary shaping means. The lifting means may also be employed to prevent the extending portion of the glass sheet from sagging as the glass sheet is being lifted by the plenum.

U.S. Pat. Nos. 4,305,746 to Hagedorn et al and 4,496,386 to Hymore et al teach a method of and apparatus for press bending sheets into complex shapes. Glass sheets are preliminarily shaped by conveying the sheets over curved conveyor rolls. The apparatus further includes an outline-type press member having a first array of spaced apart shaping rail elements mounted in an array and adapted to pass upward between adjacent conveyor rolls to contact and support the under surface of the heat softened glass sheet. Another array of shaping rail extensions is positioned above the conveying rolls, mounted for movement into and out of association with the spaces between the spaced apart shaping rail elements of the first array of rail elements. The shaping rail elements press the perimeter of the glass sheet into engagement with an upper shaping rail or mold.

U.S. Pat. No. 4,501,603 to Frank et al teaches a method of and apparatus for shaping glass sheets to complicated shapes, including an end portion bent sharply relative to a main portion. The apparatus incorporates a vacuum holder and a movable shaping rail. The main portion of the hot glass sheet is held in vacuum engagement against the main portion of the shaping surface defined by the vacuum holder. The shaping rail engages the edge portion of the hot glass sheet to sandwich the latter between a corresponding end portion of the vacuum holder while vacuum is still applied to the vacuum holder.

SUMMARY OF THE INVENTION

An object of the present invention is to provide an apparatus for shaping heat softened glass sheets. The glass sheets are pressed between an upper shaping mold having an upper glass sheet engaging surface generally corresponding to the final desired shape of the glass sheet and a lower shaping mold aligned with the upper shaping mold. The lower shaping mold includes a glass sheet engaging surface having a first portion which complements and generally parallels a first aligned portion of the upper sheet engaging surface, a wing portion which extends from the first portion of the lower mold and is not parallel to a corresponding second aligned portion of the upper sheet engaging surface, and a ring portion which is positioned outwardly from the wing portion and generally complements a third aligned portion of the upper sheet engaging surface of the upper mold near a portion of the perimeter of the glass sheet. The ring portion is moved from a first position wherein the ring portion is in a non-engaging position relative to the heat softened glass sheet to a second position wherein the ring portion contacts and engages a perimeter portion of the heat softened glass sheet to press the perimeter portion against the third aligned portion of the upper mold. The ring portion may be pivotally secured to the lower mold, such that the ring portion pivots from the first position to the second position. Actuators may be used to pivot the ring portion. The lower mold may include additional wing portions and associated ring portions extending from the first portion of the lower mold.

Another object of this invention is to provide a method for shaping heat softened sheet material. A lower mold is provided with a sheet engaging surface having a first portion corresponding to a portion of the final sheet configuration to shape and support the sheet and a second portion to support the sheet. The sheet is deposited on the lower mold and pressed between the lower mold and a vertically aligned upper mold having a sheet engaging surface generally corresponding to the final sheet configuration. A peripheral portion of the sheet is lifted off of the second portion of the lower mold and pressed against a corresponding aligned portion of the upper mold. The upper mold may be a vacuum mold to hold the shaped sheet thereagainst after pressing.

The mold arrangement in the present invention supports and shapes a heat softened glass sheet in a horizontal press bending arrangement so as to minimize any optical defects in the final shaped glass sheet due to undesired sagging of the glass sheet during the shaping operation. In particular, the lower mold supports the majority of the glass sheet while allowing only a small portion of the sheet to overhang the edge of the mold. During shaping, ring portions of the lower mold engage the overhanging peripheral portions of the glass sheet to lift these portions and those portions of the glass sheet that are supported by portions of the lower mold that do not correspond to the final desired glass sheet, and press these portions against the corresponding aligned portions of the upper mold.

DETAILED DESCRIPTION OF THE INVENTION

Figure 1:
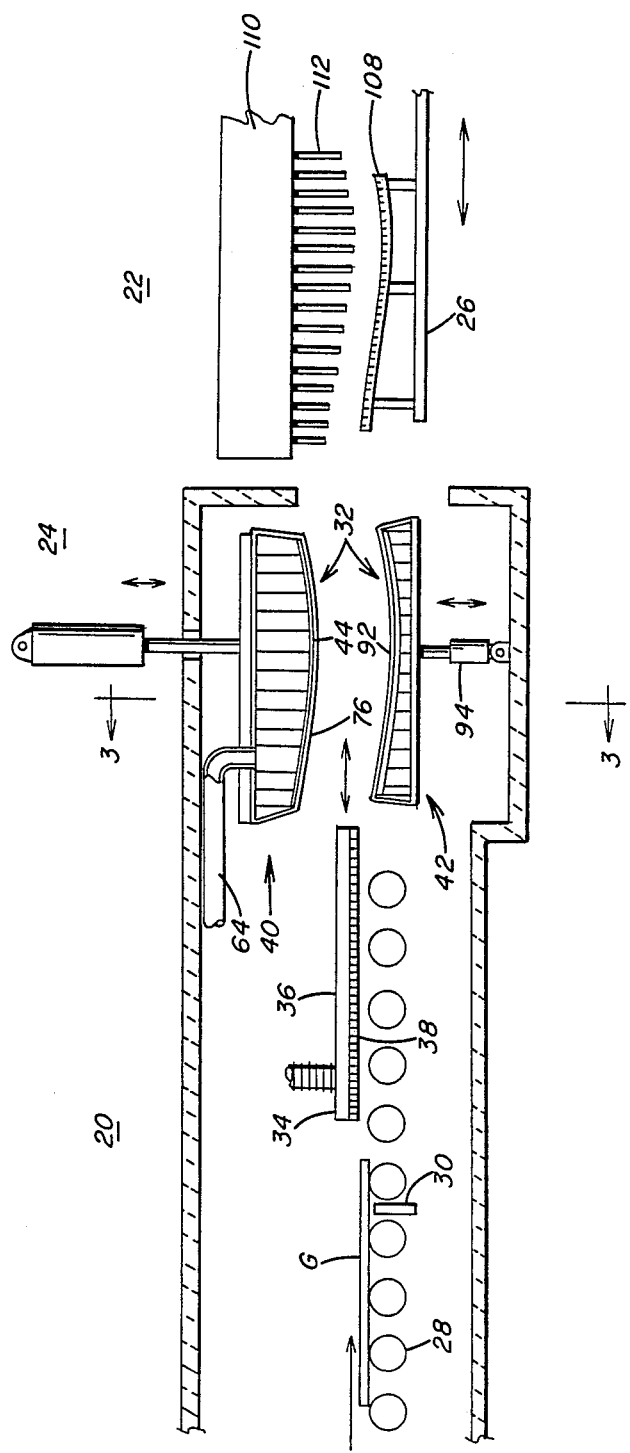
FIG. 1 is an elevational view of a horizontal press bending arrangement illustrating a heating, shaping, and cooling arrangement incorporating the present invention.

Referring to FIG. 1, an apparatus for heating and shaping sheets of material such as glass includes a furnace 20 through which the glass sheets are conveyed while being heated to their heat softening temperature. It should be appreciated that although in the preferred embodiment the sheet material is glass, the invention is not limited to glass and may be used with other heat softenable, deformable materials. A cooling station generally indicated at 22 for cooling the curved sheets of glass and an unloading station (not shown) is located beyond the cooling station 22 to the right of the furnace 20 as shown in FIG. 1. Shaping station 24 incorporating the present invention is disposed between the furnace 20 and the cooling station 22. A sheet transfer device 26 located in the cooling station 22 transfers the shaped glass sheets from the shaping station 24 to the cooling station 22.

Heat may be provided to the furnace 20 in any convenient manner, for example, from gas burners or by electrical radiant heaters or by a combination of both, which heat supplying means are well known in the art. The furnace 20 includes a horizontal conveyor comprising longitudinally shaped transversely extending conveyor rolls 28 that define the path of travel which extends through the furnace 20. The conveyor rolls 28 may be arranged in sections so that the speed of the different conveyor sections may be controlled and synchronized in a manner well known in the art for proper movement and positioning of glass sheets through the furnace 20. It is obvious to one skilled in the art that conveyor systems other than the conveyor rolls 28 may be used to convey the glass sheets G through the furnace 20, e.g., a gas hearth support bed as disclosed in U.S. Pat. No. 4,508,556 to Bennett et al, which teachings are hereby incorporated by reference.

With continued reference to FIG. 1, a glass sensing element 30 is located within the furnace 20 to initiate a cycle of operation for bending. The glass sensing element 30, electronic limit switches (not shown), and various timer circuits are provided to synchronize the operation of various elements of the bending operation according to a predetermined sequence.

The shaping station 24 includes a pair of vertically aligned upper and lower pressing molds 32 as will be discussed later. It should be appreciated that if required, a shaping station 24 may be included within the furnace 20 or in a separately heated chamber (not shown).

A transfer device 34 engages the heat softened glass sheet within the furnace 20 and moves it into and positions it at the shaping station 24. Although not limited in the present invention, the particular embodiment illustrated in FIG. 1 utilizes a shuttling vacuum pick-up 36. The pick-up 36 is positioned at the exit end of the furnace 20 where it draws a vacuum to lift a glass sheet G against its sheet engaging surface 38. If required, auxiliary lifters (not shown) may be used to lift the glass sheet G into engagement with the vacuum pick-up 36. The pick-up 36 then travels to a position between the molds 32 where it terminates the vacuum and deposits the heat softened glass sheet at the shaping station 24. The pick-up 36 thereafter moves either back into the furnace 20 or to a position adjacent to the shaping station 24.

Figure 3:
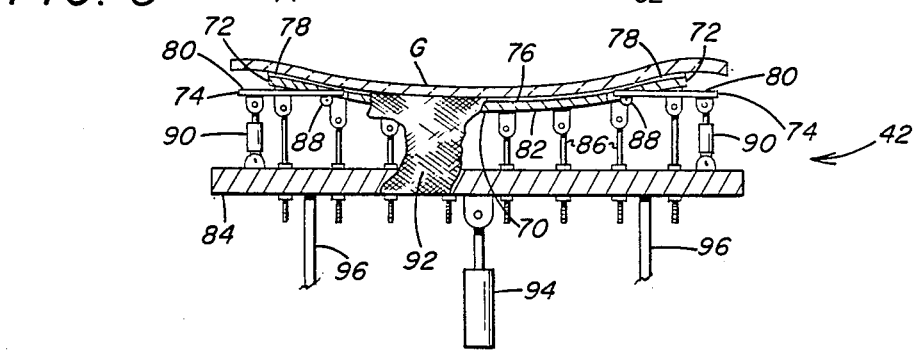
FIG. 3 is a cross-section through line 3—3 of FIG. 1 illustrating the upper and lower molds of the present invention is non-pressing position with portions removed for clarity.

The shaping station 24 includes an upper vacuum mold 40 and a lower mold 42. The upper mold 40 includes a downwardly facing press face 44 having the final desired configuration of the glass sheet to be shaped. Although not limiting in the present invention, the upper mold 40 may be constructed in a manner similar to that disclosed in U.S. Pat. No. 4,579,577 to Claassen, which teachings are hereby incorporated by reference. Referring to FIG. 3, the press face 44 of the upper mold 40 includes an apertured flexible wall member 46 constructed from any flexible heat resistant material, for example steel, which is connected to an upper mounting plate 48 through a plurality of adjustable connectors 50. The connectors 50 include a rod 52 with a first end 54 pivotally connected to the inner surface of the wall 46 and the opposite end 56 extending through and adjustably secured to the mounting plate 48 so that the contours of the flexible wall member 46 can be changed and modified as required. Mounting plate 48 is suitably connected through upper vertical guides 58 to an upper frame (not shown) and is moveable relative thereto by an upper piston 60. The upper mold 40 is covered with a heat resistant cloth cover 62, such as fiberglass, to insulate the heat softened glass from the mold 40. The cover 62 is drawn across the apertured press face 44 and secured to mounting plate 48 in any convenient manner, for example, clamps.

Referring to FIGS. 1 and 3, the upper vacuum mold 40 communicates with a source of vacuum (not shown) through an evacuation line 64. The source of pressurized air (not shown) and valves for the vacuum and pressure line may be synchronized according to a predetermined time cycle.

Vacuum chamber 66 of the upper mold 40 may be formed by spanning the open end between mounting plate 48 and wall 46 with a non-porous, heat resistant material to seal the chamber 66. Although not limiting in the present invention, in the particular embodiment illustrated in FIG. 3, the peripheral portion 68 of the fiberglass cover 76 spanning between the flexible wall 46 and mounting plate 48 may be coated with a heat resistant silicon rubber, for example Dow Corning 736 Silastic ® RTV or any other heat resistant sealant to prevent air flow there through and provide a vacuum seal. When vacuum is drawn in the vacuum chamber 66 through evacuation line 64, the coated fiberglass cloth seals the space between the plate 48 and wall 46 so that air enters chamber 66 only through apertured wall 46.

While the mold construction described in connection with upper mold 40 includes a flexible wall type construction, one skilled in the art will appreciate that the invention is not so limited and that alternate mold construction may include other materials that provide and maintain a smooth surface contour and good durability despite intermittent contact with hot glass which causes rapid cyclic temperature variations over an extended period of time. For example, the mold 38 may be constructed of ceramic material with an apertured press face and a central vacuum chamber (not shown) as disclosed in U.S. Pat. No. 4,265,650 to Reese et al, which teachings are hereby incorporated by reference.

Figure 2:
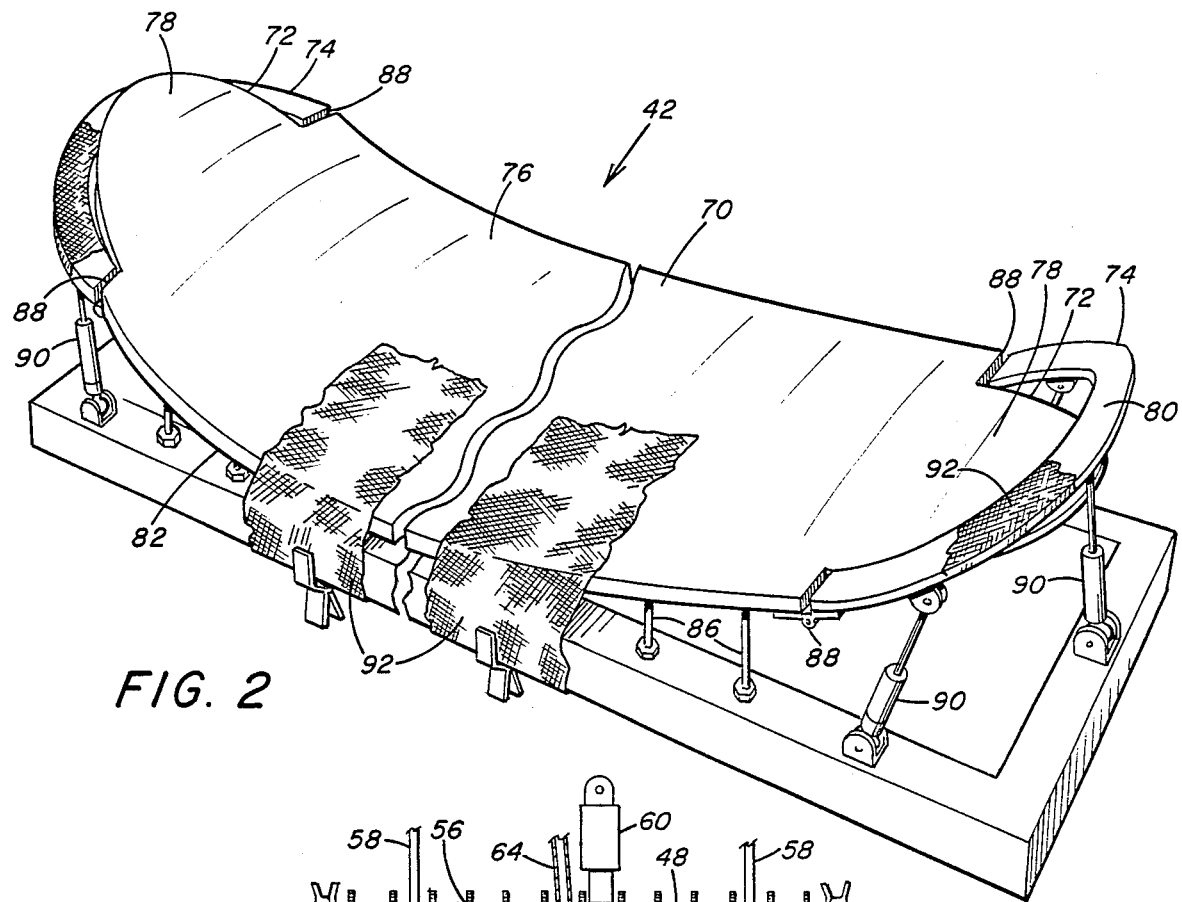
FIG. 2 is an isometric view of the lower mold of the present invention showing the ring portions in both a non-pressing and a pressing position with portions removed for clarity.
Figure 4:
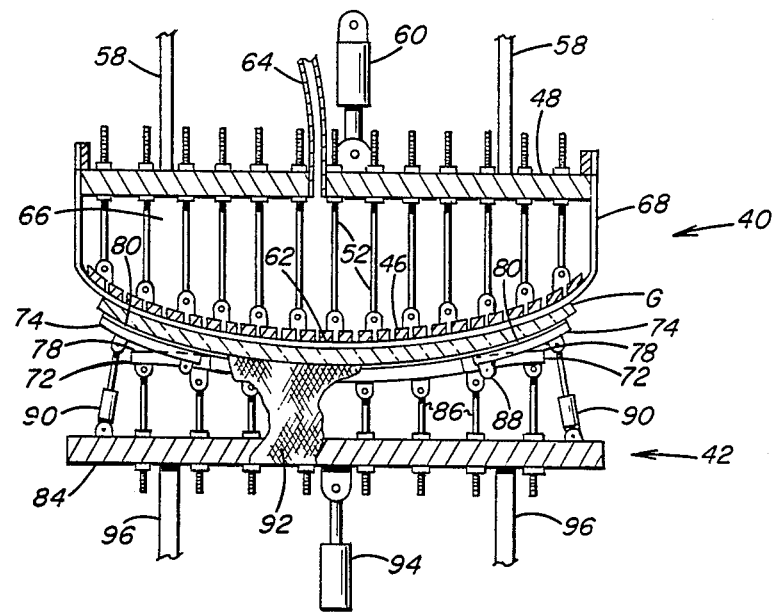
FIG. 4 is a view similar to that shown in FIG. 3 illustrating the upper and lower molds in pressing engagement with Portions removed for clarity.

In the particular embodiment of the invention illustrated in FIGS. 2, 3 and 4, the lower mold 42 includes a central portion 70 with opposing extended wing portions 72 and a pair of opposing pivoting ring members 74. The central portion 70 of the mold 42 includes a full surface press face 76 which generally parallels and complements the press face of a corresponding portion of the upper mold 40. The sheet supporting surfaces 78 of the extended wing portions 72 do not parallel or complement the press face 44 of the upper mold 40 but rather extend away from the pressing surface as can be seen in FIG. 4 which illustrates the upper mold 40 and lower mold 42 in pressing engagement. The ring members 74 of the lower mold 42 have a sheet shaping surface 80 which generally parallels and complements the peripheral areas of the upper mold 40 when in pressing engagement therewith as shown in FIG. 4.

The lower mold 42 may be constructed in a manner similar to that disclosed for the upper mold 40. In particular, the central portion 70 and wing portions 72 of the mold 42 may include an imperforate, flexible wall member 82 adjustably connected to a rigid support plate 84 by adjustable connectors 86. The connectors 86 may be adjusted to modify the configuration of the wall member 82. The ring members 74 are connected to the support plate 84 and pivot relative to the central portion 70 about hinge 88. The ring portions 74 are moved by an actuator 90. The actuator 90 moves the ring member 74 of the mold 42 from a lowered, open position as shown in the left portion of FIG. 2 and in FIG. 3 to a raised, pressing position as shown the right portion of FIG. 2 and in FIG. 3. If required, multiple actuators may be used to raise ring portion 74 into engagement with the glass sheet G and upper mold 40 as shown in FIG. 2. The central portion 70, wing portions 72, and ring members 74 may be covered with a heat resistant cloth covering 92, such as fiberglass, to insulate the glass sheet G from the mold 42. A lower piston 94 is connected to the rigid plate support 84 to move the lower mold 42 in a vertical direction along lower vertical guide 96.

It should be appreciated that although the ring portion 74 in the preferred embodiment as shown in FIGS. 2, 3 and 4 is pivotally connected directly to the lower mold 42, the invention is not meant to be so limited and alternate configurations may be used. For example, FIGS. 2, 3 and 4 may be modified such that the ring portions 74 are unattached to the lower mold 42 and may move in and out of engagement with the glass sheet G via an actuating mechanism (not shown). In addition, the ring portion 74 may be mounted on the upper mold 40 in a manner similar to that disclosed in U.S. Pat. No. 4,501,603 to Frank et al, which teachings are hereby incorporated by reference.

Figure 5:
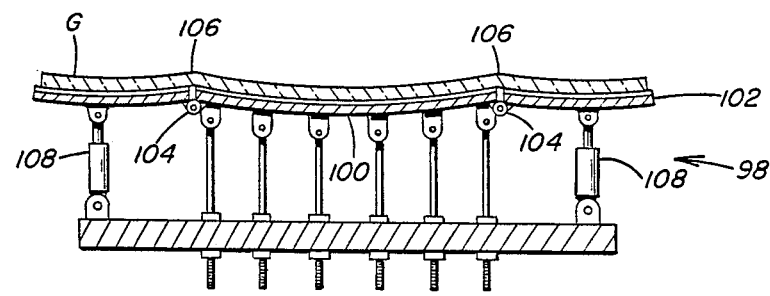
FIG. 5 is a schematic view similar to FIG. 3 illustrating a coventional mold with pivoting end portions.

Referring to FIG. 5, a conventional mold configuration 98 used to shape glass sheets to deep wrap configurations includes a stationary central portion 100 and pivoting wing sections 102 which rotate about hinge 104. When these outer wing sections 102 are in a down and open non-pressing configuration and the hot glass sheet G is deposited thereon prior to press bending, the glass sheet G begins to sag under the force of gravity. In particular, the glass sheet assumes a reverse configuration 106 over the hinge 104 across the entire width of the glass sheet along the line between the stationary center portion 100 and the pivoting wing portions 102. When the outer wing portions 102 are pivoted upwardly by actuator 108 to press the glass sheet G against a complementing upper full surface press face of an upper mold (not shown) such as that shown in FIGS. 3 and 4, it is difficult to completely remove any optical distortion caused by the reverse curvature configuration resulting from the initial sagging of the glass sheet on the lower mold 98.

Referring to FIGS. 3 and 4, the extended wing portions 72 of the present invention support the glass sheet G in a manner that limits the amount of reverse curvature the glass sheet can assume due to the initial sag bending of the glass sheet after being deposited on the lower mold 42. In particular, the wing sections 72 extend nearly to the outer perimeter of the final glass shape configuration so that only an outer peripheral portion of the glass sheet G extends initially unsupported from the mold 42 and is susceptible to sag that would result in optical defects. As a result, since there is less unsupported overhang, there is less sag in the glass sheet about its unsupported perimeter and thus less severe reverse curvature. During pressing, the ring sections 74 pivot upwardly as shown in FIG. 4 to lift the peripheral portions of the heat softened glass sheet G and those portions of the glass sheet supported by wing portions 72 into engagement with the shaping surface 44 of the upper mold 40. In this fashion, there is minimal optical distortion caused by reverse sag configurations at the hinge point of the pivoting ring section 74 and no distortion in the major viewing area of the glass sheet G.

Referring to FIG. 1 after shaping, the upper mold 40 holds the heat softened glass sheet thereagainst by vacuum while the molds 40 and 42 separate to allow tempering ring 108 to be positioned beneath the upper vacuum mold 40. The vacuum is terminated and the shaped glass sheet G is deposited on the tempering ring 108 and removed to the cooling station 22 for subsequent processing. Plenum 110 and nozzles 112 direct cooling fluid at the major surface of the shaped glass sheet G to impart a temper.

The form of the invention shown and described in this disclosure represents an illustrative preferred embodiment of the apparatus containing the present invention. It is understood that various changes may be made without departing from the gist of the invention as defined in the claimed subject matter which follows.

We claim:

1. An apparatus for shaping a heat softened sheet material comprising:
    an upper shaping mold with an upper sheet engaging surface generally corresponding to the final desired sheet shape;
    a lower shaping mold aligned with said upper mold, said lower mold having a lower sheet engaging surface including a first portion which complements and generally parallels a first aligned portion of said upper sheet engaging surface, a wing portion extending from said first portion of said lower mold, said wing portion being nonparallel to a corresponding second aligned portion of said upper sheet engaging surface and a ring portion positioned outwardly from said wing portion, said ring portion generally complementing a third aligned portion of said upper sheet engaging surface of said upper mold near a portion of the perimeter of said sheet;
    means to press said heat softened sheet between said upper and lower mold; and
    means to move said ring portion from a first position wherein said ring portion is in a non-engaging position relative to said heat softened glass sheet to a second position wherein said ring portion contacts and engages said perimeter portion of said heat softened sheet to press said perimeter portion against said third portion of said upper mold.

2. The apparatus as in claim 1 further including means to heat said sheet material to its heat softening temperature.

3. The apparatus as in claim 2 further including means to transfer said heat softened sheet from said heating means to said shaping station between said upper and lower shaping molds.

4. The apparatus as in claim 3 wherein said upper mold is a vacuum mold.

5. The apparatus as in claim 4 wherein said moving means includes an actuator to move said ring portion from said first position to said second position.

6. The apparatus as in claim 5 wherein said ring portion is pivotally secured to said lower mold and said moving means pivots said ring portion from said first position to said second position.

7. The apparatus as in claim 6 wherein said wing portion is a first wing portion and said ring portion is a first ring portion and further including a second wing portion extending from said first portion in opposing relation to said first wing portion and a second pivoting ring portion positioned outwardly from said second ring portion, said second ring portion having an engaging surface which complements a portion of said upper sheet engaging surface of said upper mold near a portion of the perimeter of said sheet and means to move said second ring portion from a non-engaging position with said sheet to an engaging position with said sheet.

8. The apparatus as in claim 7 wherein said sheet material is a glass sheet.

9. A method of shaping a heat softened sheet material comprising:
    providing a lower mold with a sheet engaging surface having a first portion corresponding to a portion of the final sheet configuration to shape and support said sheet and an adjacent second portion to support said sheet;
    depositing said glass sheet on said lower mold;
    pressing said sheet between said lower mold and a vertically aligned upper mold having a sheet engaging surface generally corresponding to the final sheet configuration;
    lifting a peripheral portion of said sheet so as to lift said sheet off of said second portion of said lower mold; and
    pressing said peripheral portion against a corresponding aligned portion of said upper mold.

10. The method as in claim 9 wherein said upper mold is a vacuum mold and further including the step of holding said shaped sheet against said vacuum mold after said pressing and engaging steps.

11. The method as in claim 10 wherein said first and second portions of said lower mold support only a portion of said sheet and allow said peripheral portion of said sheet to extend beyond the edge of said second portion of said lower shaping mold.

* * * * *